US010743707B2

(12) United States Patent
Bugnano et al.

(10) Patent No.: US 10,743,707 B2
(45) Date of Patent: Aug. 18, 2020

(54) CAPSULE OR CARTRIDGE AND INFUSION ASSEMBLY FOR THE PREPARATION OF A BEVERAGE, IN PARTICULAR COFFEE

(71) Applicant: LUIGI LAVAZZA S.p.A, Turin (IT)

(72) Inventors: Luca Bugnano, Moncalieri (IT); Alberto Cabilli, Moncalieri (IT); Denis Rotta, Dronero (IT); Danilo Bolognese, Turin (IT)

(73) Assignee: LUIGI LAVAZZA S.p.A, Turin (IT)

( * ) Notice: Subject to any disclaimer, the term of this patent is extended or adjusted under 35 U.S.C. 154(b) by 467 days.

(21) Appl. No.: 15/657,409

(22) Filed: Jul. 24, 2017

(65) Prior Publication Data
US 2017/0319003 A1    Nov. 9, 2017

Related U.S. Application Data

(62) Division of application No. 14/439,138, filed as application No. PCT/IB2013/060848 on Dec. 12, 2013, now abandoned.

(30) Foreign Application Priority Data

Dec. 14, 2012   (IT) .............................. TO2012A1076

(51) Int. Cl.
A47J 31/44     (2006.01)
B65D 85/804    (2006.01)
A47J 31/40     (2006.01)

(52) U.S. Cl.
CPC ......... *A47J 31/4492* (2013.01); *A47J 31/407* (2013.01); *B65D 85/8043* (2013.01)

(58) Field of Classification Search
CPC .. A47J 31/4492; A47J 31/407; B65D 85/8043
(Continued)

(56) References Cited

U.S. PATENT DOCUMENTS 3,095,801 A    7/1963 Fogg
3,309,980 A    3/1967 Bozek
(Continued)

FOREIGN PATENT DOCUMENTS

DE   10 2011 010 534 A1   8/2012
EP      0 584 314 B1      7/1996
(Continued)

OTHER PUBLICATIONS

International Search Report of PCT/IB2013/060848 dated Mar. 31, 2014 [PCT/ISA/210].
(Continued)

*Primary Examiner* — Lorne E Meade
*Assistant Examiner* — Kuangyue Chen
(74) *Attorney, Agent, or Firm* — Sughrue Mion, PLLC

(57) ABSTRACT

A capsule or cartridge (1) including a cup-shaped body (2) with a bottom wall (3), a lateral wall (4) and a flange-like top formation (5) which is essentially planar and extends transversely towards the outside, and a cover (6) fixed to the flange-like formation (5) of the body (2), such as to define a chamber (7) containing the material for the preparation of the beverage, in particular ground roasted coffee. The lateral wall (4) of the body (2) has a plurality of projections (8) and recesses (9) which as a whole define at least an identification of the capsule (1). The projections (8) and recesses (9) are aligned in an essentially rectilinear direction, belonging to a plane essentially parallel to the flange-like formation (5) of the body (2) of the capsule (1).

6 Claims, 9 Drawing Sheets

(58) Field of Classification Search
USPC .......................................................... 99/285
See application file for complete search history.

(56) References Cited

U.S. PATENT DOCUMENTS

| | | | |
|---|---|---|---|
| 5,243,164 A | 9/1993 | Erickson et al. | |
| 10,485,372 B2* | 11/2019 | Rijskamp ............. | A47J 31/0668 |
| 2010/0077928 A1 | 4/2010 | Schmed et al. | |
| 2011/0250319 A1 | 10/2011 | Scrivani | |
| 2013/0129872 A1* | 5/2013 | Kruger ................. | A47J 31/4492 |
| | | | 426/115 |
| 2014/0090564 A1 | 4/2014 | Vanni et al. | |
| 2015/0158665 A1* | 6/2015 | Kruger ................. | A47J 31/4492 |
| | | | 426/112 |
| 2015/0297021 A1* | 10/2015 | Bugnano ............. | A47J 31/4492 |
| | | | 99/285 |
| 2019/0359418 A1* | 11/2019 | Kruger ................. | A47J 31/4492 |

FOREIGN PATENT DOCUMENTS

| | | | |
|---|---|---|---|
| EP | 1 849 718 A1 | 10/2007 | |
| EP | 1 890 271 A1 | 2/2008 | |
| EP | 2 141 093 B1 | 8/2012 | |
| IT | TO2011A000478 | 5/2011 | |
| WO | 2012/010317 A1 | 1/2012 | |
| WO | WO-2012010317 A1 * | 1/2012 | ......... B65D 85/8043 |
| WO | 2012/028290 A1 | 3/2012 | |
| WO | 2012/164521 A1 | 12/2012 | |
| WO | 2013/111088 A1 | 8/2013 | |

OTHER PUBLICATIONS

Written Opinion of PCT/IB2013/060848 dated Mar. 31, 2014 [PCT/ISA/237].

* cited by examiner

CAPSULE OR CARTRIDGE AND INFUSION ASSEMBLY FOR THE PREPARATION OF A BEVERAGE, IN PARTICULAR COFFEE

CROSS REFERENCE TO RELATED APPLICATIONS

This application is a Divisional of U.S. application Ser. No. 14/439,138, filed Apr. 28, 2015, which is a National Stage of International Application No. PCT/IB2013/060848, filed Dec. 12, 2013, claiming priority based on Italian Patent Application No. TO2012A001076, filed Dec. 14, 2012, the contents of all of which are incorporated herein by reference in their entirety.

BACKGROUND OF THE INVENTION

Field of the Invention

The present invention relates, in general, to the preparation of beverages by extraction under pressure with the use of capsules or cartridges.

More specifically, the invention relates to a capsule or cartridge of the type comprising
- a cup-shaped body with a bottom wall, a lateral wall and a flange-like top formation which is essentially planar and extends transversely towards the outside, and
- a cover fixed to the flange-like formation of said body, such as to define a chamber containing a substance for the preparation of the beverage, in particular ground roasted coffee;
- wherein the lateral wall of the cup-shaped body has a plurality of recesses and projections which protrude outwards, which as a whole define at least an identification of the capsule.

Background

International application WO 2012/010317 A1 describes and illustrates several embodiments of capsules of this type. For example, FIG. 1 of this document illustrates a solution in which the lateral wall of the cup-shaped body of a capsule has a plurality of parallel circular annular projections, the longitudinal profile of which defines an identification of the capsule, "readable" by means of an optical detector. FIGS. 18-22 of said document illustrate another capsule in which the lateral wall of the cup-shaped body has identification projections and recesses, evenly spaced around the circumference thereof, forming a toothed crown. The number, size and spacing of the projections define an identification of the capsule.

For example, as shown in FIG. 18 of said document, only a capsule that has a toothed crown defined by projections/recesses with predetermined characteristics can engage with, and pass, a pinion gear which is arranged, in a machine for the preparation of beverages, at the entry to a conduit for the introduction of capsules. This solution is also not very flexible as it conveys, through the toothed crown made up of projections and recesses, only a limited amount of information: in practice it does no more than accept or reject a capsule for use in a given machine.

European application EP 1 890 271 A1 describes and illustrates solutions based on the use of RFID tags to define an identification of capsules or cartridges for use in a machine for the preparation of beverages provided with an RFID reader. For this purpose, an RFID tag, containing information that identifies the capsule and how it is to be used in the machine, is applied to a perimeter configuration in the form of flanges on each capsule or cartridge.

It is an object of the present invention to provide capsules or cartridges of the type defined above, having improved features.

SUMMARY OF THE INVENTION

This and other objects are achieved according to the invention with a capsule or cartridge for the preparation of a beverage of the type defined above, characterized primarily in that said projections and recesses are aligned in an essentially rectilinear direction, belonging to a plane essentially parallel to the flange-like formation of the body of the capsule.

Preferably, in one embodiment of a capsule according to the invention, in proximity to the flange-like formation, the cup-shaped body has at least one essentially planar lateral wall portion or face in which there is provided said plurality of projections and recesses.

Advantageously, in proximity to the flange-like formation, the cup-shaped body of a capsule according to the invention may have at least two external lateral wall portions or faces which are essentially planar and parallel with each other and in which there are provided respective pluralities of identification projections and recesses.

Also advantageously, in proximity to the flange-like formation, the cup-shaped body may have four external lateral wall portions or faces which are essentially planar and parallel each to another one, and in which there are provided respective pluralities of projections and recesses.

In one embodiment, the cup-shaped body of a capsule according to the invention has a first lateral wall portion whose transverse cross-section, from the bottom wall to the flange-like formation, passes gradually from an essentially circular shape to an at least approximately quadrangular shape.

Between said first lateral wall portion and the flange-like formation, the cup-shaped body conveniently has a second wall portion which is essentially prismatic, with a transverse cross-section having an essentially quadrangular shape, with preferably rounded and externally convex vertexes, and in which there are provided said lateral planar faces with the identification projections/recesses.

Further advantageous features of the capsules or cartridges according to the present invention are defined in the dependent claims.

A further object of the present invention is to provide an infusion assembly for a machine for the preparation of beverages with the use of capsules or cartridges having the features defined in claim 1 and optionally the features defined in the claims which are dependent on claim 1.

BRIEF DESCRIPTION OF THE DRAWINGS

Further features and advantages of the invention will appear from the detailed description which follows, provided purely by way of non-limiting example, with reference to the accompanying drawings, in which.

DETAILED DESCRIPTION OF THE INVENTION

Figure 1:
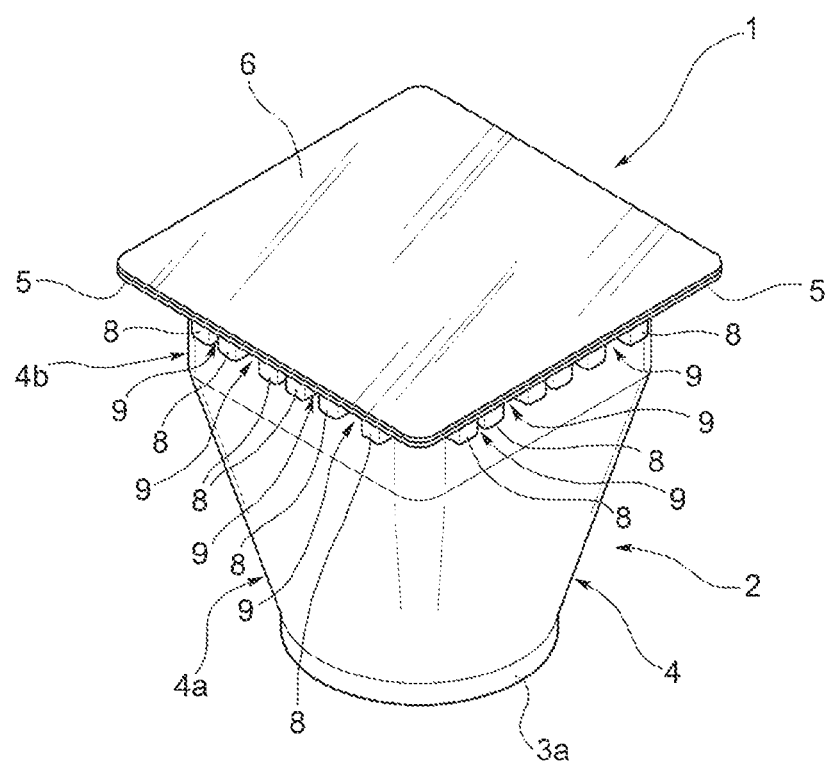
FIG. 1 is a perspective view from above of a capsule according to the present invention.
Figure 2:
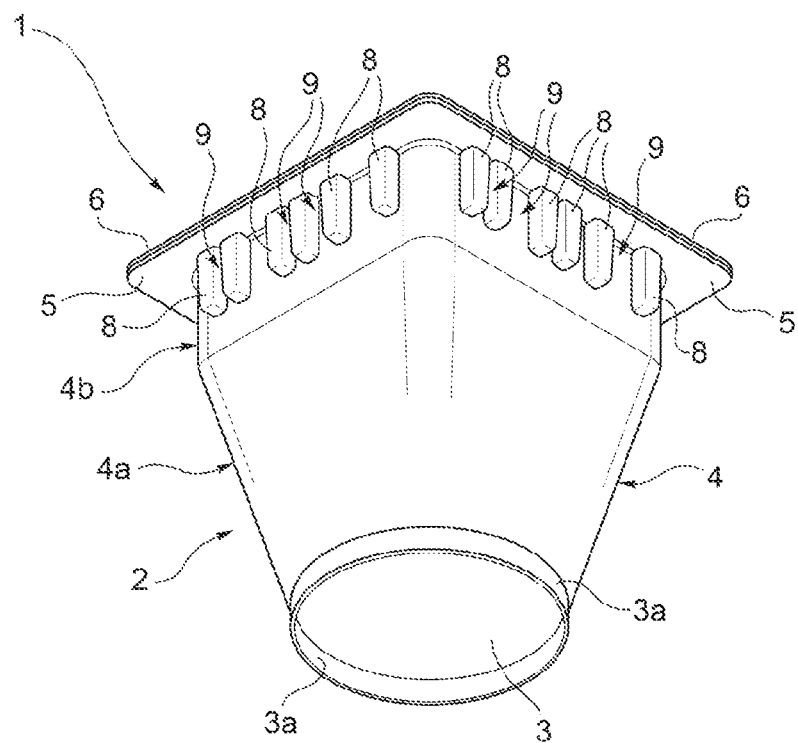
FIG. 2 is a perspective view from below of the capsule according to FIG. 1.

FIGS. 1 and 2 show (general reference sign 1) a capsule for the preparation of a beverage, in particular espresso coffee, according to the present invention.

The capsule 1 illustrated therein comprises a cup-shaped body 2, having a bottom wall 3, a lateral wall with the general reference sign 4, and a flange-like top formation 5, which is essentially planar and extends transversely towards the outside.

The capsule 1 further comprises a cover 6, fixed, for example by heat sealing, to the flange-like formation 5 of the body 2, in such a way as to define and enclose a chamber 7 (FIGS. 3 and 4) containing a quantity or dose of a material for the preparation of the beverage, for example ground roasted coffee.

Figure 4:
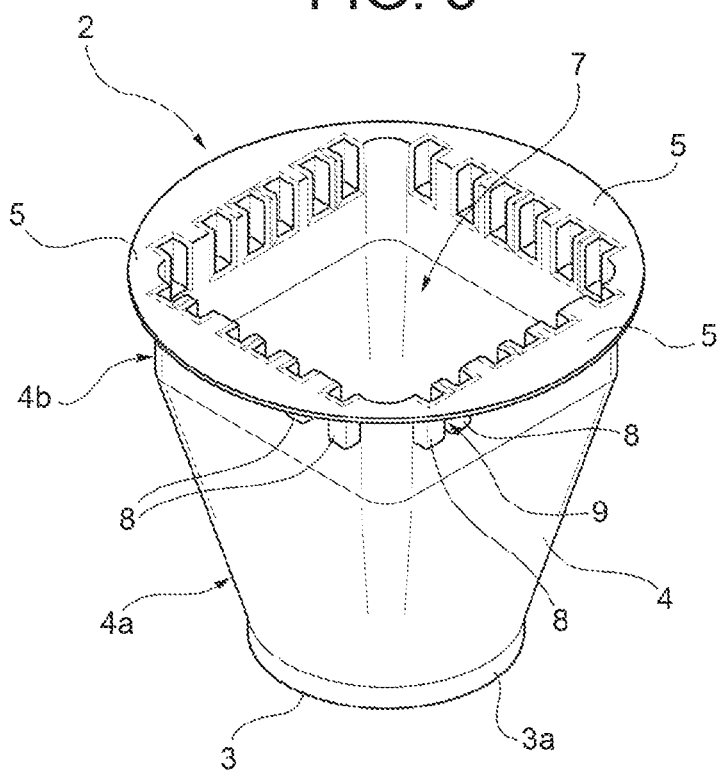

With the exception of the embodiment shown in FIG. 4, the cup-shaped body 2 of a capsule 1 according to the accompanying drawings presents a flange-like formation 5 having an essentially quadrangular outer perimeter.

In the embodiment according to FIG. 4, the flange-like formation 5 instead has an essentially circular outer perimeter.

In any case, it is appropriate for the cover 6 to have a shape corresponding to the outer perimeter of the flange 5 of the capsule body 2 to which it must be fixed.

In the embodiments shown in the drawings, the cup-shaped body 2 has an essentially circular bottom wall 3, with a peripheral edge 3a projecting axially from the side opposite the flange-like formation 5.

Accordingly, the cup-shaped body 2 has a first lateral wall portion 4a, the transverse cross-section of which, from the bottom wall 3 in the direction of the flange-like formation 5, passes gradually from an essentially circular shape to an at least approximately quadrangular shape, with preferably rounded vertexes.

The lateral wall portion 4a of the body 2 is connected to the flange-like formation 5 by means of a second wall portion 4b, of essentially prismatic shape, with preferably rounded and externally convex corners.

In proximity to the flange-like formation 5, the cup-shaped body 2 of the capsules illustrated in the drawings thus has four essentially planar lateral wall portions or faces, formed by the lateral surface portion 4b.

In other embodiments, the cup-shaped body 2 may have just one essentially planar lateral wall portion or face.

In each planar lateral wall portion or face, the cup-shaped body 2 has a plurality of projections 8 and recesses 9.

The projections 8 protrude transversely towards the outside and the number of projections, together with the arrangement thereof, define an identification of the capsule 1.

The projections 8 and the recesses 9 of each planar face or surface of the body 2 are mutually aligned in an essentially rectilinear direction, belonging to a plane essentially parallel to the flange-like formation 5.

Figure 3:
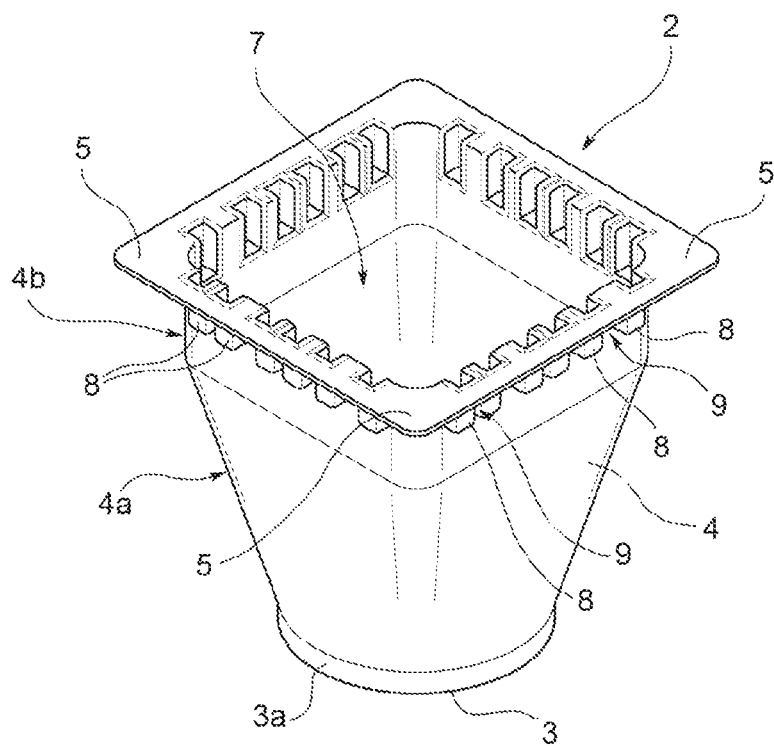
FIGS. 3 and 4 show, in perspective view, two embodiments of a cup-shaped body included in a capsule or cartridge according to the present invention.

As can be seen in FIGS. 3 and 4, the projections 8 are internally hollow and the cavities thereof are in communication with the region 7 inside the cup-shaped body 2.

The thickness of the walls of the projections 8, and the material of which the cup-shaped body 2 is made, are such that the projections 8 may be torn, to allow water and/or steam to enter (also) through the lateral wall 4 in the cup-shaped body 2, substantially in accordance with the solution forming the subject matter of Italian patent application TO2011A000478 in the name of the same Applicant. The tearing or cutting of the projections 8 may advantageously be achieved using an infusion assembly according to International application WO2013/111088 A1, also in the name of the same Applicant.

With reference to FIGS. 3 and 4, the projections 8 are advantageously adjacent the flange-like formation 5, with which they join such that the inner perimeter of the flange-like formation 5 has a corresponding plurality of indentations.

The projections 8 and the recesses 9 may be detected, for example in the manner described below, and interpreted as elements of a code, such as binary code, that identifies the capsule. Thus, for example, each projection 8 may be interpreted as a logical "1", and each recess having a width equal to a predetermined pitch may be interpreted as a logical "0".

The projections 8 and the recesses 9 may also be attributed other meanings, with a view to creating, and subsequently decoding, the identification of the capsule.

Capsules provided with an identification in the form of projections and recesses according to the invention may be used in machines for the preparation of beverages equipped with appropriate detectors/readers. An example of such devices will be described in detail below.

In order for it not to matter which way such a capsule is placed in a corresponding machine for the preparation of beverages, the projections 8 and the recesses 9 associated with two opposite planar surfaces or faces of the body 2 of the capsule may be specularly symmetrical with respect to an intermediate centre-line, so as to form a corresponding identification/information code which is specularly symmetrical.

Alternatively, the projections and the recesses of at least two parallel planar faces of the body 2 of the capsule may form an identification/information code containing information that indicates the direction in which the capsule has been placed in the machine, and therefore the direction of "reading" thereof. Thus, for example, the sequence of projections and recesses may contain two projections 8 close together at one end, and a (relatively) isolated relief at the other end, in such a way as to allow the "readers" to detect the direction in which the user has placed the capsule in the machine.

Further embodiments of the projections or protrusions, and the associated recesses, will be described below, in particular with reference to FIGS. 15 and 16.

In a capsule according to the invention in which the cup-shaped body 2 has four essentially planar lateral wall portions or faces, which are parallel each to another one, the projections 8 and the recesses 9 of each of these lateral wall portions or faces may advantageously form the same identification/information code on each of them.

With reference to FIGS. 5 to 14, an embodiment of a machine for the preparation of beverages and, in particular, the means thereof for detecting or "reading" the identification codes of a capsule 1 according to the present invention will now be described.

FIGS. 5 to 14 show, by way of example and in simplified form, only (and partially) the infusion assembly of said machine, said assembly being associated with a device for introduction of a capsule and for reading the identification/information code of the capsule.

Figure 5:
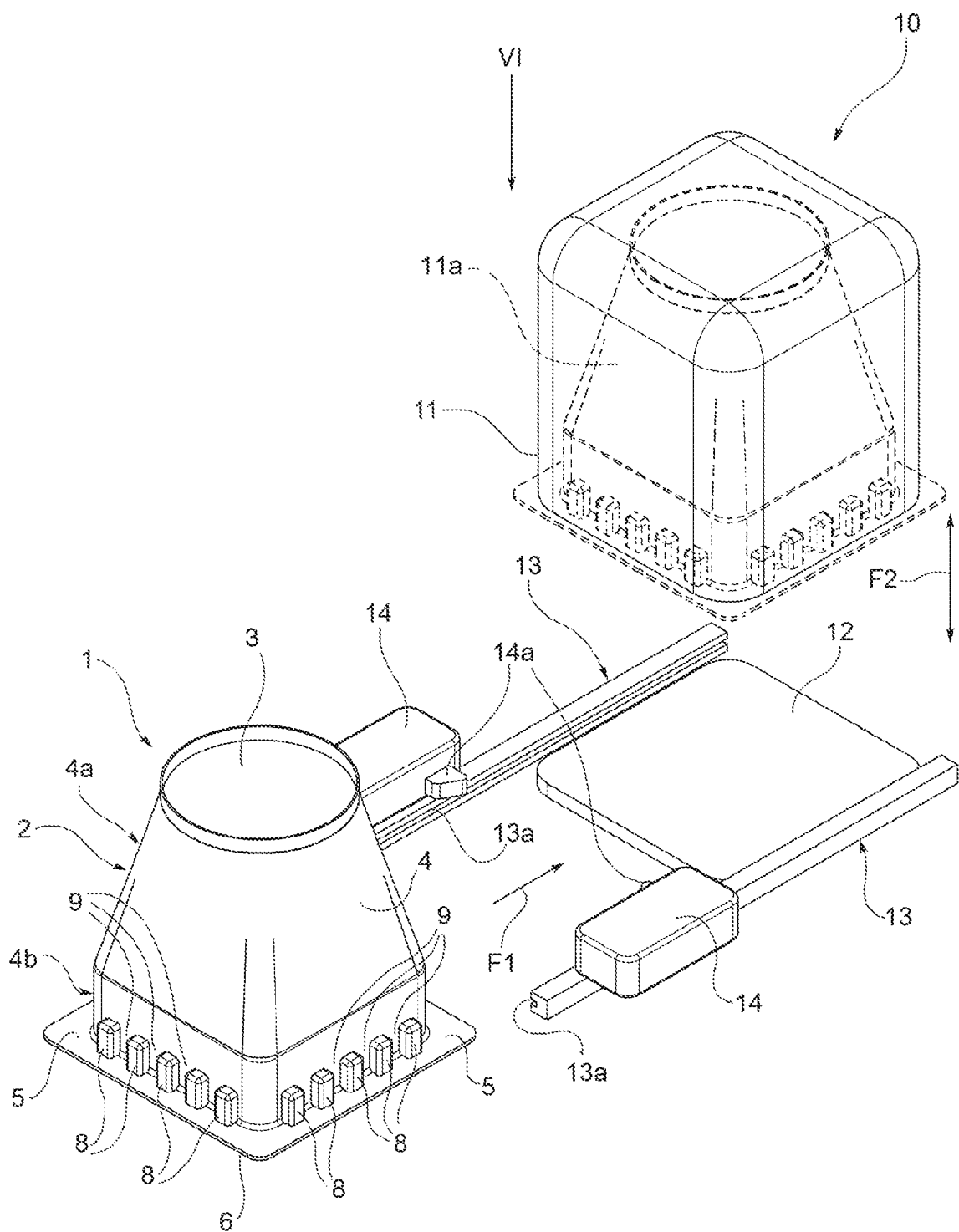
FIG. 5 is a perspective view which shows, in simplified form, part of a machine for the preparation of beverages, for use with capsules according to the present invention.

In FIG. 5, reference sign 10 generally indicates an infusion assembly, of a type known per se, for the preparation of a beverage by extraction under pressure, with the use of a capsule 1 as described above.

Figure 13:
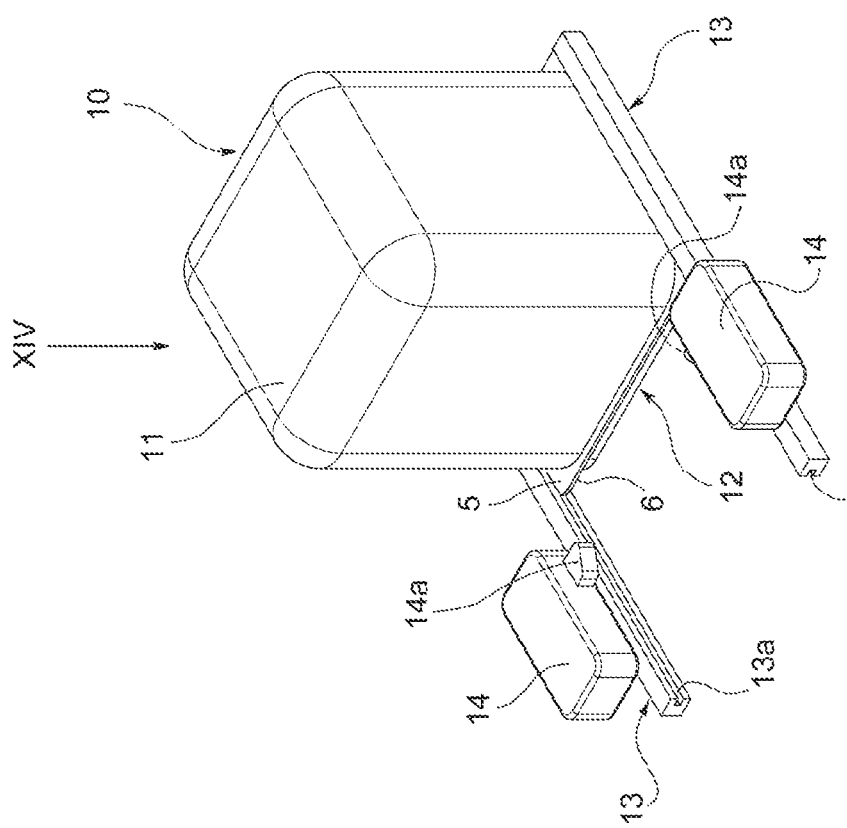
FIG. 13 is a view similar to that presented in FIG. 11, and shows the infusion assembly when closed, ready for extraction of the beverage.

The infusion assembly 10 comprises a first and a second part, 11 and 12, which may be moved with respect to one another, between a relative position of opening, shown in FIG. 5, and a closed position shown in FIG. 13.

In the exemplary embodiment shown, the part 11 is movable, and has a cavity inside, shown in broken lines in FIG. 5 where it is indicated with 11a, which can receive a capsule 1 as described above.

The part 12 is fixed. The latter, as known per se and not shown, may be provided with means for tearing the cover 6 of the capsule placed in the infusion assembly 10, and for injecting hot water and/or steam under pressure into the capsule 1, to make the beverage.

The movable part 11, as likewise known per se and not shown, may be provided with a device for perforating the bottom wall 3 of the capsule 1, and a conduit for dispensing the beverage made into a receiving vessel such as a glass or a cup.

The present invention is not however limited to an embodiment in which the part 11 is movable and the part 12 is fixed, but can encompass embodiments in which both parts are movable relative to one another, or in which the part 11 is fixed and the part 12 is movable.

The infusion assembly 10 is associated with a retaining and guiding device, for positioning a capsule or cartridge 1 between the two parts 11 and 12 of said assembly, when these parts are in the open position (FIG. 5).

In the exemplary embodiment shown, said retaining and guiding device comprises two straight guides 13, parallel to one another, provided with respective facing grooves 13a which can engage with two opposite sides of the perimeter of the flange-like formation 5 and cover 6 of the capsule 1.

The guides 13 define a direction of introduction of a capsule 1 in the area between the parts 11 and 12 of the infusion assembly 10, said direction being indicated by the arrow F1 in FIG. 5. This direction is essentially perpendicular to the direction in which the two parts 11 and 12 of the infusion assembly 10 move towards and away from one another, the direction that is indicated by the double arrow F2 in FIG. 5.

However, it is not imperative that the capsule 1 be introduced with a movement that follows a straight line, orthogonal to the direction of relative movement of the parts 11 and 12, just as it is not imperative that the two parts of the infusion assembly 10 move together/apart in a straight line.

Figure 6:
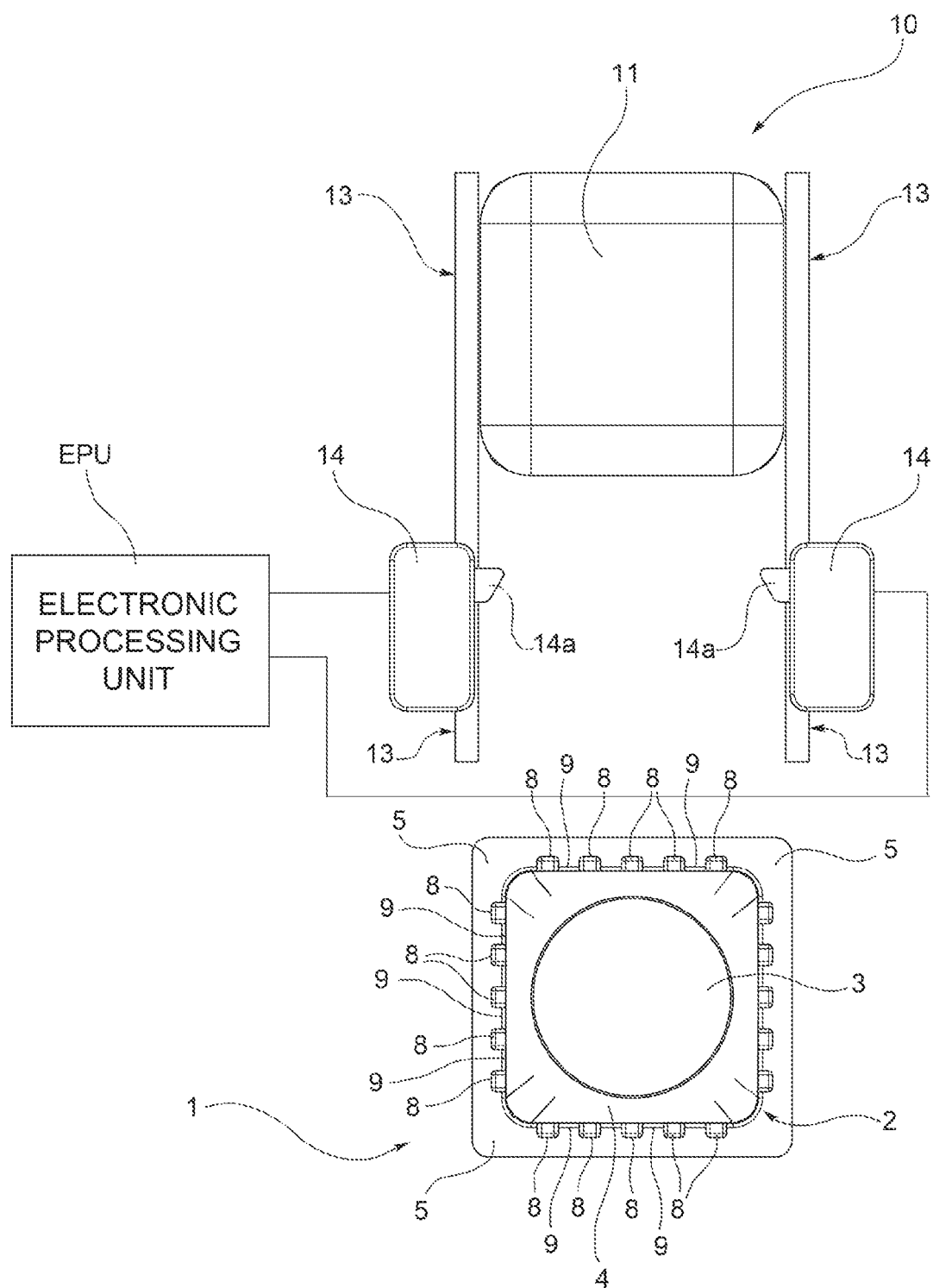
FIG. 6 is substantially a plan view from above in the direction of the arrow VI of FIG. 5.

In FIGS. 5 and 6, the capsule 1 is shown prior to the insertion of the two sides of the flange-like formation 5 into the grooves or channels 13a of the guides 13.

In the exemplary embodiment shown, two microswitches 14 are mounted on the guides 13, said microswitches facing each other in a direction transverse to the direction F1.

The microswitches 14 are each provided with a movable member 14a for controlling switching, which causes said microswitch to open and close. These members 14a protrude transversely, in such a way that they may interact with the projections 8 of two opposite planar faces of the portion 4b of the lateral surface of the body 2 of the capsule.

Each time a member 14a passes from a recess 9 to a projection 8, it causes a switching of the associated microswitch 14, for example in the sense that it causes the microswitch to open and, when it passes from a projection 8 to a recess 9, it causes reverse switching, for example causing the microswitch to close.

The push-button control members 14a of the microswitches 14 thus act as actual feelers, which explore and "read" the sequence of projections 8 and recesses 9, or the identification/information code associated with a corresponding planar surface of the body 2 of the capsule 1 inserted into the grooves 13a of the guides 13.

As can be seen in FIG. 5, the microswitches 14 are arranged along the path followed by the capsule 1 as it goes from a position of initial insertion into the guides 13 to the position (shown in FIG. 11) in which the capsule 1 is positioned between the parts 11 and 12 of the infusion assembly 10, which are still open. The "reading" of the codes associated with two opposite planar faces of the body 2 of the capsule 1 thus takes place before the capsule reaches the intermediate position of FIG. 11, and therefore before the start of infusion proper.

Figure 8:
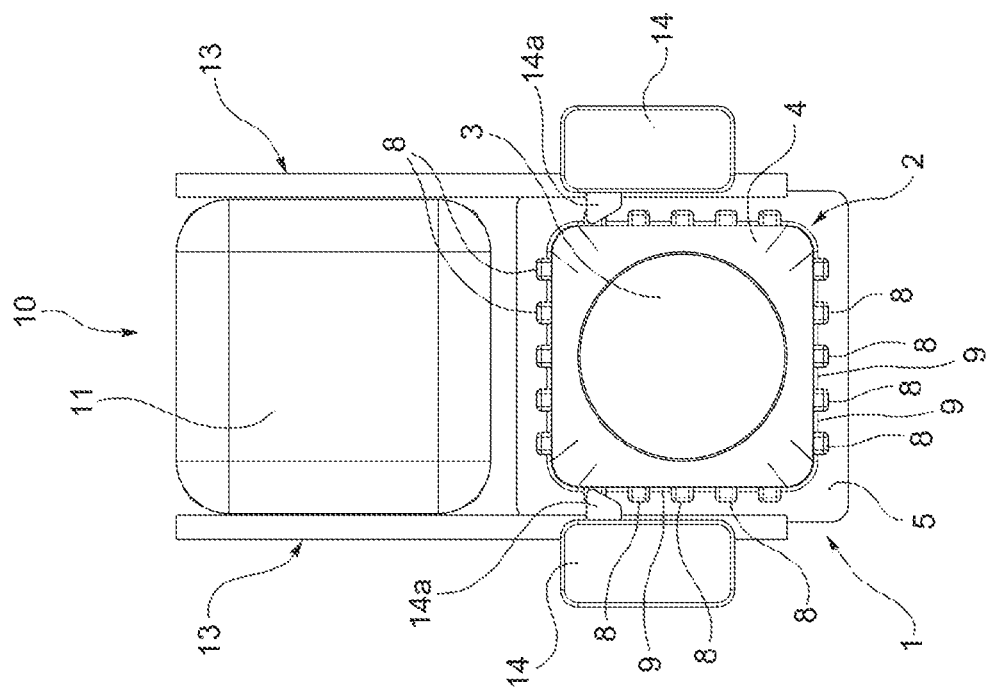
FIG. 8 is a plan view from above in the direction of the arrow VIII of FIG. 7.
Figure 7:
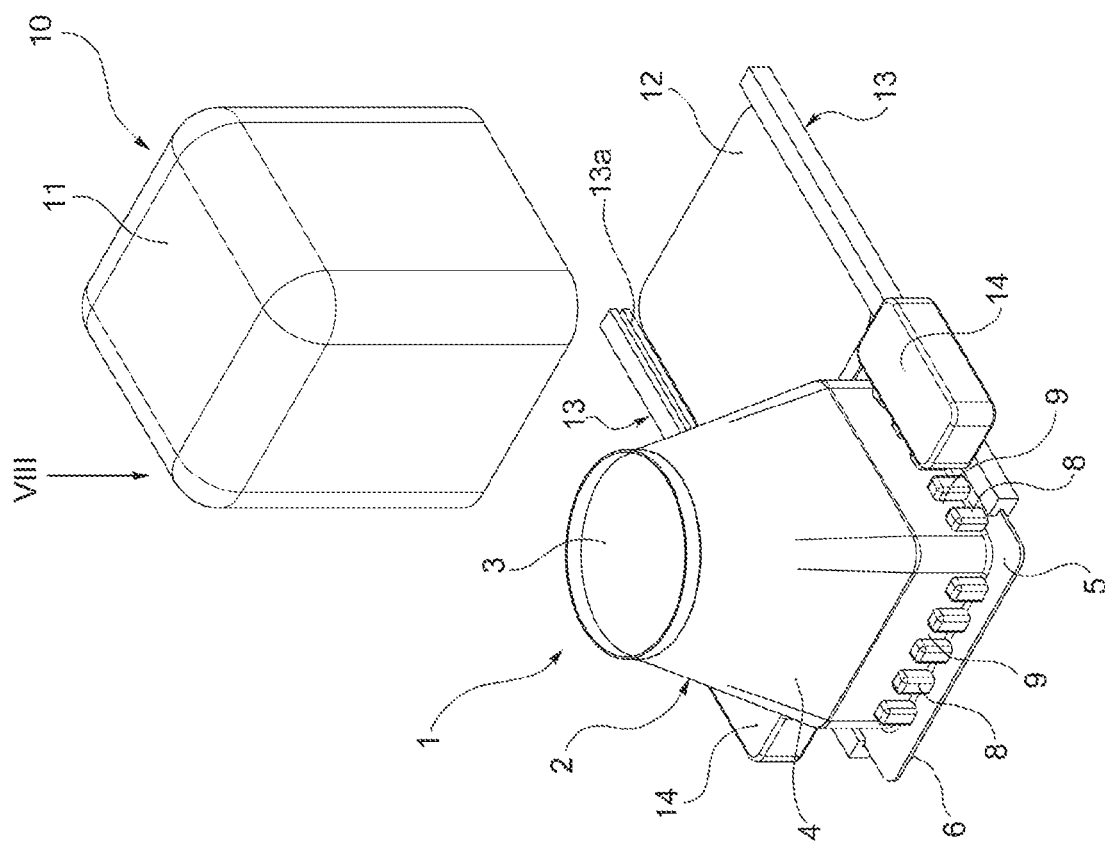
FIG. 7 is a perspective view similar to that presented in FIG. 5, and shows a different stage of use of a capsule according to the present invention.

FIGS. 7 and 8 show a capsule 1 that has already been inserted a good way into the guides 13, the microswitches 14 progressively reading the projections 8 and recesses 9 of two opposite planar faces thereof.

Figure 10:
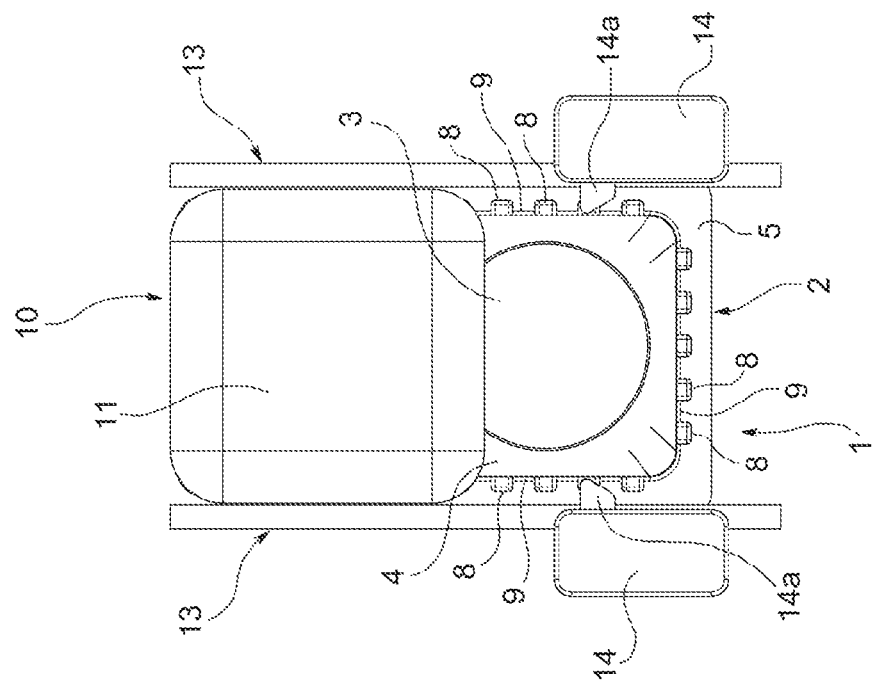
FIG. 10 is a plan view from above in the direction of the arrow X of FIG. 9.
Figure 9:
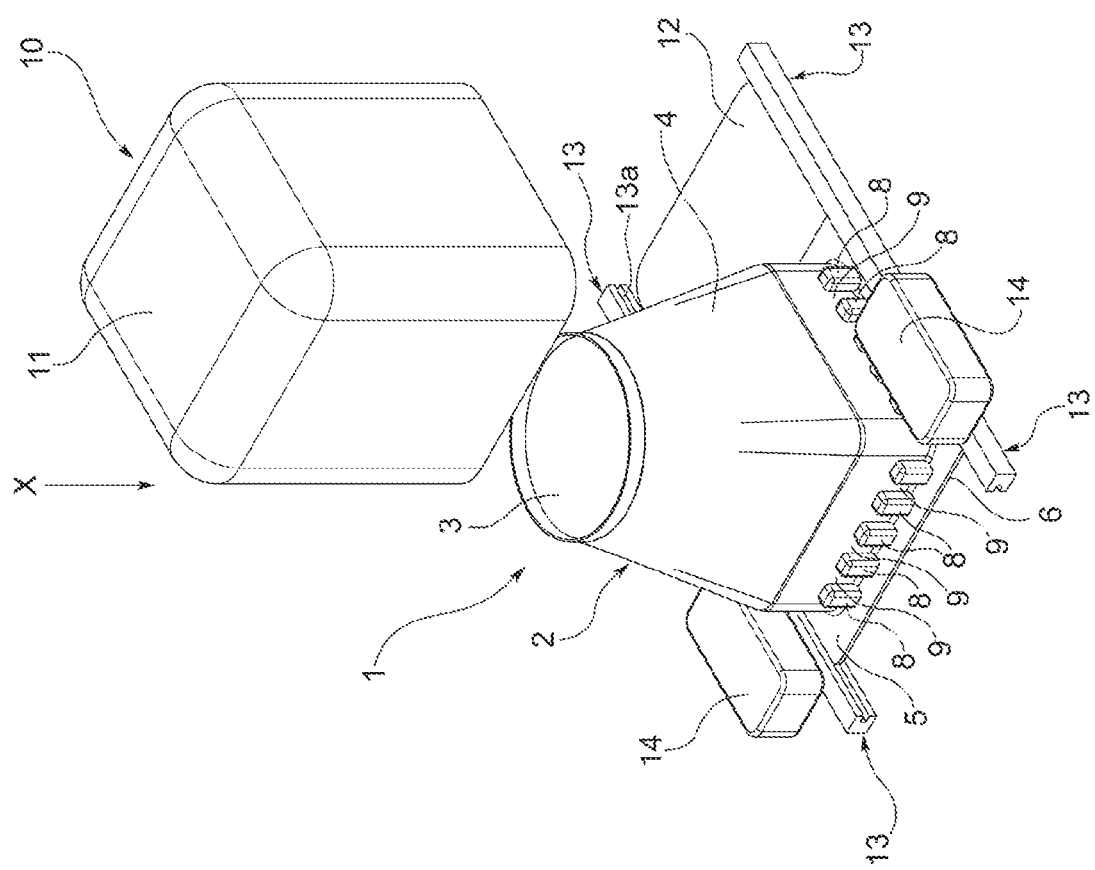
FIG. 9 is a view similar to that presented in FIG. 7, and shows a subsequent stage of use of a capsule according to the present invention.
Figure 12:
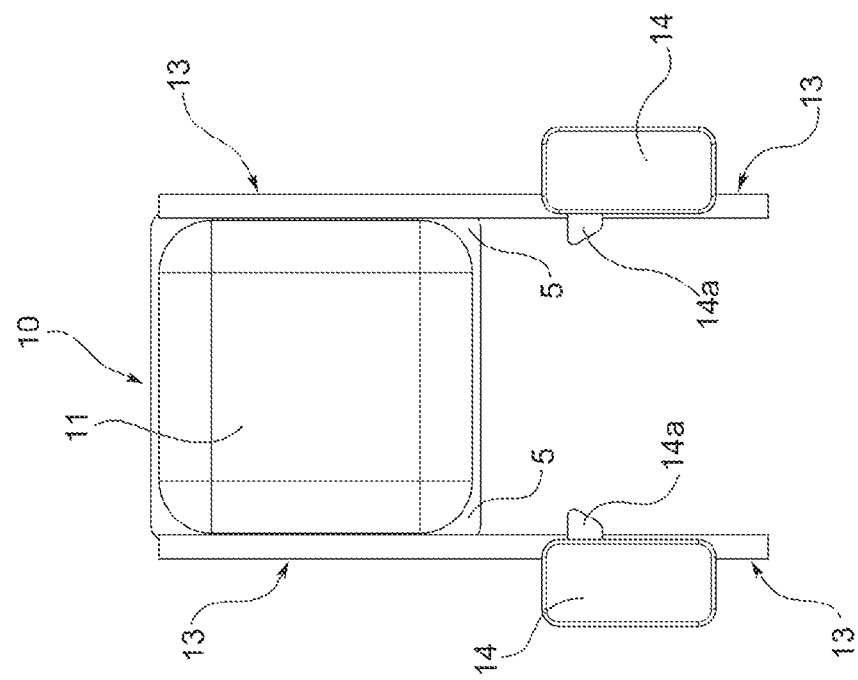
FIG. 12 is a plan view from above in the direction of the arrow XII of FIG. 11.

FIGS. 9 and 10 show the capsule 1 at a subsequent stage, in which it is beginning to be positioned between the two parts 11 and 12 of the infusion assembly 10, and the microswitches 14 are exploring the projections 8 and the recesses 9 constituting the code.

As shown in FIG. 6, the microswitches 14 are connected to an electronic processing unit EPU for detecting the switching of these microswitches, and accordingly acquiring the codes associated with the two explored sides of the capsule 1.

These codes may include information relating to the characteristics of the contents of the capsule, and the optimal conditions for making the beverage by infusion.

Figure 11:
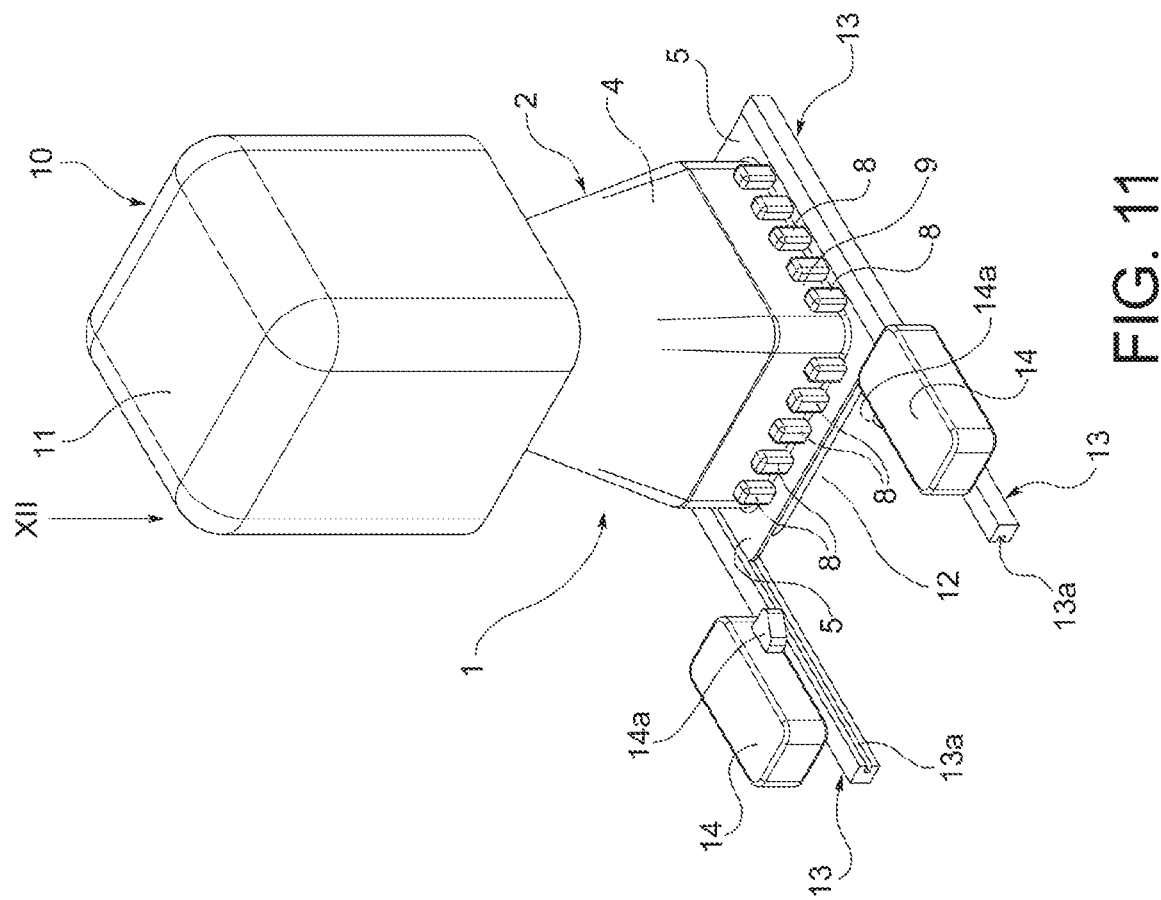
FIG. 11 is a perspective view similar to that presented in FIG. 9, and shows a further stage of use of a capsule according to the present invention.
Figure 14:
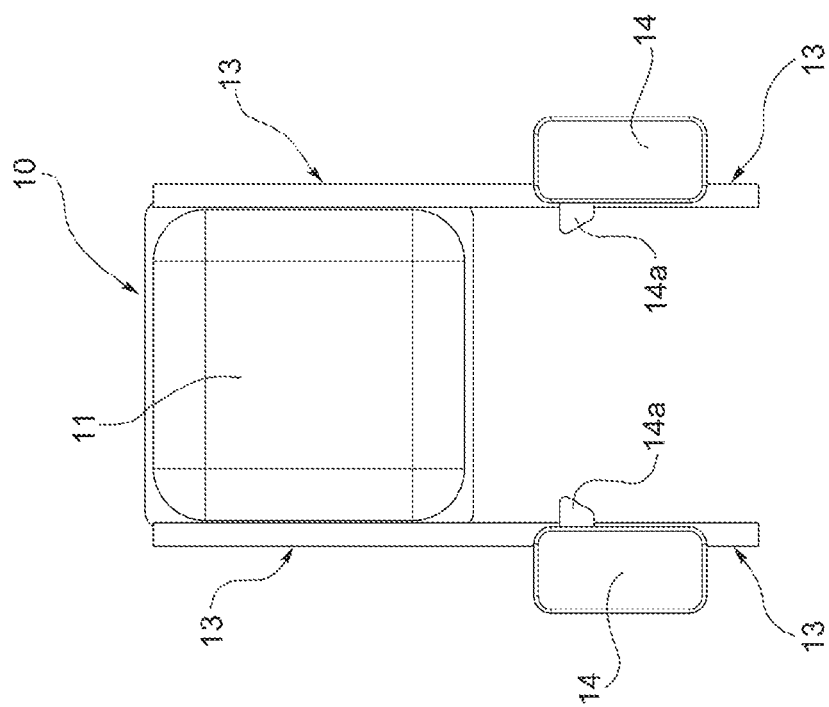
FIG. 14 is a plan view from above in the direction of the arrow XIV of FIG. 13.

Once the capsule 1 has reached the position shown in FIG. 11, the two parts 11 and 12 of the infusion assembly 10 are prompted to move towards one another, until said assembly is in the closed position, as shown in FIGS. 13 and 14.

In this position, the capsule 1 is locked inside the infusion chamber defined by the two parts 11 and 12 of the assembly 10, which firmly clamp the flange-like formation 5 and cover 6 of said capsule.

In a manner known per se, the injection of hot water and/or steam into the capsule, and the extraction of the beverage, which is dispensed into a receiving vessel (not shown), may then be commanded.

The parameters (for example the flow rate, pressure and temperature of the water injected) may advantageously be determined on the basis of the identification/information code detected by means of the microswitches 14 and analysed and recognized by the electronic processing unit EPU.

After the beverage has been extracted and dispensed, the infusion assembly 10 may be reopened, and the used capsule 1 can be removed, in one of several ways known per se.

As soon as the assembly 10 is open once more as shown in FIGS. 5 and 6, the machine is ready for the start of a new cycle of beverage preparation, by insertion of a fresh capsule therein.

Figure 16:
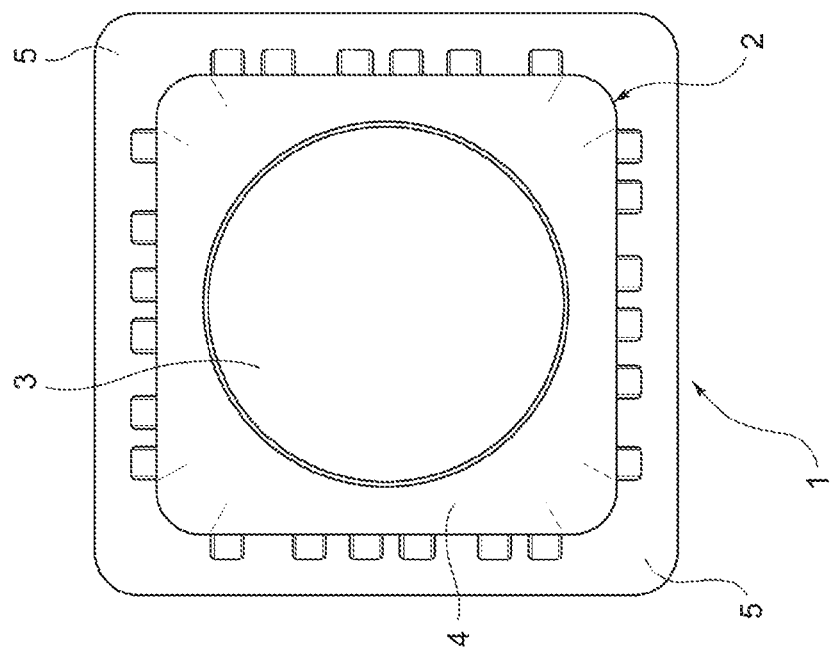
FIGS. 15 and 16 are plan views from below of two different capsules according to the present invention.
Figure 15:
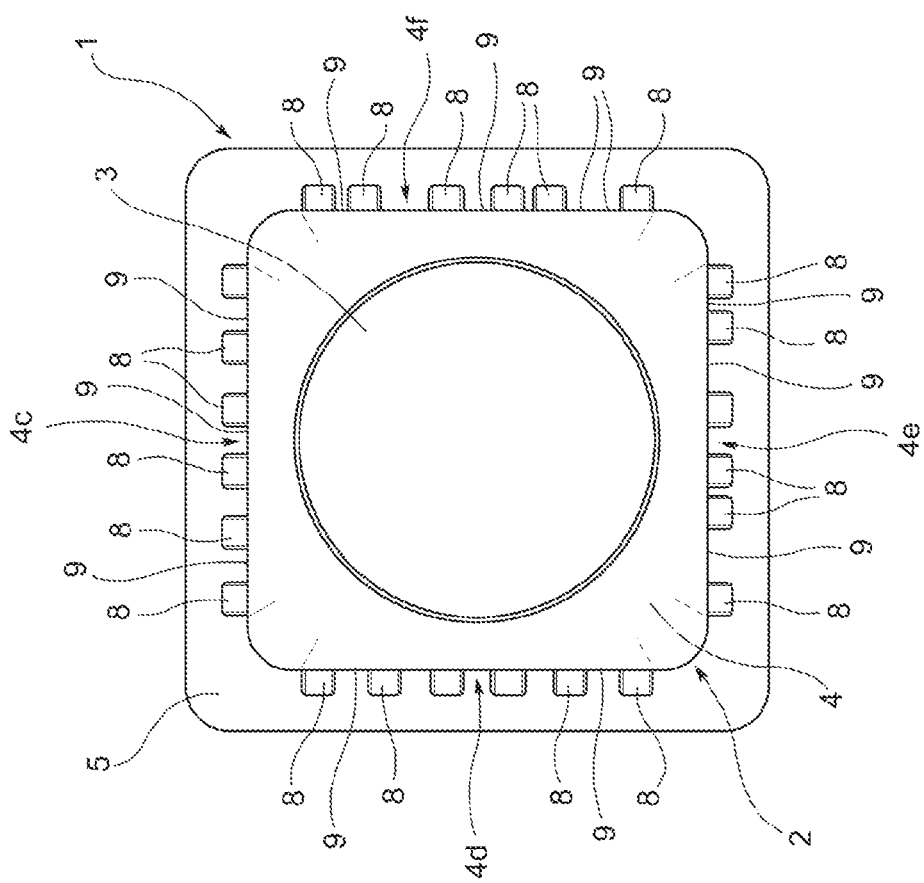

FIGS. 15 and 16 show two capsules 1 according to the present invention, with particular embodiments of projections 8 and recesses 9 on two pairs of facing planar faces or surfaces.

In the capsule according to FIG. 15, each one of a pair of peripherally contiguous planar faces or surfaces 4c, 4d bears projections 8 and recesses 9 that define the same auxiliary reference code ("clock" code), whereas each one of a pair of peripherally contiguous planar faces or surfaces 4e, 4f bears projections 8 and recesses 9 that define the actual identification/information code of the capsule 1.

The auxiliary reference code arranged on faces 4c and 4d comprises a plurality of projections 8, evenly distributed and evenly spaced (by corresponding recesses 9) in the rectilinear direction of alignment thereof.

In the embodiment shown in FIG. 15, each projection 8 on the planar faces or surfaces 4e, 4f is aligned with a corresponding projection 8 of the auxiliary reference code borne by the faces 4c, 4d.

In a variant embodiment, the projections 8 on the faces 4e, 4f can be staggered relative to corresponding projections 8 of the auxiliary reference code borne by the planar face or surface opposite. If such an offset or phase shift is not equal to one half-width of a recess 9 on the faces 4c, 4d, the electronic processing unit EPU can recognize the direction of insertion of the capsule 1 into the machine. Alternatively, the two "readers" 14 of codes carried by two opposite faces of the capsule may be staggered with respect to one another, in the direction F1 of insertion of the capsule 1.

In the embodiment according to FIG. 16, all the planar faces or surfaces 4c-4f all bear the same distribution of projections 8 and recesses 9 which defines the identification/information code associated with the capsule 1. Moreover, this distribution is designed in such a way that the logical addition of the codes of two opposite faces (e.g. faces 4c and 4e, or faces 4d and 40 corresponds to the auxiliary reference code of the faces 4c and 4d of the embodiment according to FIG. 15.

With the capsule according to FIG. 16, the electronic processing unit EPU detects the same code irrespective of the direction of insertion of the capsule in the machine for the preparation of the beverage. Moreover, the code of each face may be used as auxiliary reference code for the code borne by the planar face or surface opposite.

Naturally, many other modes of coding may be used by specialists in the field.

With the solution according to the present invention, it is possible to create, by means of projections and recesses on the lateral wall of a capsule, relatively well-structured codes capable of conveying more information than could be conveyed by prior art solutions.

Naturally, without prejudice to the principle of the invention, the forms of embodiment and details thereof may be varied widely with respect to what has been described and illustrated purely by way of non-limiting example, without thereby exceeding the scope of the invention as defined in the following claims.

What is claimed is:

1. An infusion assembly (10) for a machine for the preparation of a beverage using a capsule (1) containing a substance for the preparation of the beverage, comprising
   a first part and a second part (11, 12) configured to be displaced one with respect to the other between a relative opening position in which the capsule (1) is interposed therebetween, and a relative closing position in which the first and second parts jointly define an infusion chamber in which the capsule (1) is enclosed;
   retaining and guiding means (13) configured to allow a guided displacement of the capsule (1) from an introduction position to an intermediate position in which the capsule extends between said first and second parts (11, 12) when the first and second parts are in the relative opening position; and
   a detector (14) configured to detect the identification of the capsule (1) defined by a plurality of projections (8) protruding transversely and recesses (9), during the passage thereof from said introduction position to said intermediate position,
   wherein the capsule comprises a cup-shaped body, having a bottom wall, a lateral wall, and a flange-like top formation which is essentially planar and extends transversely, wherein at least one essentially planar lateral portion of the lateral wall has the plurality of projections and recesses, said projections and recesses defining an identification of the capsule and being mutually aligned in an essentially rectilinear direction, belonging to a plane essentially parallel to the flange-like top formation.

2. The infusion assembly according to claim 1, wherein the detector is at least one of optical or mechanical.

3. The infusion assembly according to claim 2, wherein the detector (14) comprise at least one electric microswitch (14) provided with a movable member (14a) controlling the switching thereof, configured to cause the opening and the closing thereof, said electric microswitch (14) being disposed adjacent the retaining and guiding means (13) such that the movable member (14a) thereof is adapted to detect said at least one plurality of projections (8) and recesses (9), and to cause a switching of the electric microswitch at each transition from a projection (8) to a recess (9), and from a recess (9) to a projection (8).

4. The infusion assembly according to claim 2, wherein the detector comprise a pair of electric microswitches (14) disposed opposite each other in a direction transverse to a displacement direction (F1) of the capsule (1), along said retaining and guiding means (13), and each adapted to detect the respective plurality of projections (8) and recesses (9) of the body (2) of the capsule (1).

5. The infusion assembly according to claim 2, wherein the detector (14) comprise at least one optical reading device adapted to scan said at least one plurality of projections (8) and recesses (9) and to provide an electric signal which has a commutation in correspondence of each transition from one of the projections (8) to one of the recesses (9), and from the recess (9) to the projection (8).

6. The infusion assembly according to claim 2, wherein the detector comprise a pair of optical readers disposed opposite one another in a direction transverse to a direction of displacement (F1) of the capsule (1) along said retaining and guiding means (13), and configured to detect or scan the respective plurality of projections (8) and recesses (9) of the body (2) of the capsule (1).

\* \* \* \* \*